(12) United States Patent
Sakamoto et al.

(10) Patent No.: US 7,954,887 B2
(45) Date of Patent: Jun. 7, 2011

(54) REAR STRUCTURE OF VEHICLE

(75) Inventors: Akihiro Sakamoto, Toyota (JP); Takero Kato, Toyota (JP); Masao Hitomi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 301 days.

(21) Appl. No.: 11/992,379

(22) PCT Filed: Sep. 20, 2006

(86) PCT No.: PCT/IB2006/002599
§ 371 (c)(1),
(2), (4) Date: Mar. 21, 2008

(87) PCT Pub. No.: WO2007/034295
PCT Pub. Date: Mar. 29, 2007

(65) Prior Publication Data
US 2009/0085380 A1  Apr. 2, 2009

(30) Foreign Application Priority Data

Sep. 21, 2005 (JP) ................................. 2005-274209

(51) Int. Cl.
*B62D 25/08* (2006.01)
(52) U.S. Cl. ............. 296/193.08; 296/37.2; 296/203.01; 296/204
(58) Field of Classification Search ................ 296/37.2, 296/193.08, 203.01, 203.04, 204, 187.01, 296/187.03, 187.11, 29, 30; *B62D 25/08*
See application file for complete search history.

(56) References Cited

U.S. PATENT DOCUMENTS

| | | | | | |
|---|---|---|---|---|---|
| 2,636,774 | A | * | 4/1953 | Lindsay | 296/204 |
| 3,517,765 | A | * | 6/1970 | Eggert, Jr. et al. | 180/312 |
| 4,060,270 | A | * | 11/1977 | Croissant | 296/37.2 |
| 4,563,035 | A | * | 1/1986 | Hirakami et al. | 296/203.04 |
| 4,582,357 | A | * | 4/1986 | Nakamura et al. | 296/203.03 |
| 4,687,124 | A | * | 8/1987 | Mahr | 224/42.24 |
| 5,364,128 | A | * | 11/1994 | Ide | 280/784 |
| 5,549,350 | A | * | 8/1996 | Akiyama et al. | 296/204 |
| 5,567,005 | A | * | 10/1996 | Kosuge et al. | 296/204 |
| 5,611,592 | A | | 3/1997 | Satou et al. | |

(Continued)

FOREIGN PATENT DOCUMENTS

JP    57-059187    9/1955

(Continued)

OTHER PUBLICATIONS

International Search Report.

(Continued)

*Primary Examiner* — Glenn Dayoan
*Assistant Examiner* — Pinel E Romain
(74) *Attorney, Agent, or Firm* — Finnegan, Henderson, Farabow, Garrett & Dunner, LLP

(57) ABSTRACT

A rear structure (10) of a vehicle is provided in which a lower back reinforcement (16) is provided longitudinally forward of a lower back panel (12). A gusset (34) connects the lower back reinforcement (16) and a rear floor side member (20) in a longitudinally and laterally oblique direction. Accordingly, when a collision load is applied to the vehicle from an oblique rear direction of the vehicle, the change in the angle formed by the lower back reinforcement (16) and the rear floor side member (20) is suppressed and the rigidity against such a collision load is thus improved.

17 Claims, 12 Drawing Sheets

U.S. PATENT DOCUMENTS

| | | | | |
|---|---|---|---|---|
| 5,641,194 | A * | 6/1997 | Honma et al. | 296/203.03 |
| 5,797,642 | A * | 8/1998 | Takanishi et al. | 296/37.3 |
| 6,129,412 | A * | 10/2000 | Tanuma | 296/204 |
| 6,206,457 | B1 * | 3/2001 | Sakyo et al. | 296/190.08 |
| 6,206,459 | B1 * | 3/2001 | Kim | 296/198 |
| 6,209,950 | B1 * | 4/2001 | Hanyu | 296/203.02 |
| 6,234,568 | B1 * | 5/2001 | Aoki | 296/203.04 |
| 6,293,618 | B1 * | 9/2001 | Sukegawa et al. | 296/209 |
| 6,386,611 | B1 * | 5/2002 | Buchfink et al. | 296/37.1 |
| 6,402,209 | B2 * | 6/2002 | McGuiness | 293/133 |
| 6,547,318 | B2 * | 4/2003 | Takeuchi | 296/204 |
| 6,568,747 | B2 * | 5/2003 | Kobayashi | 296/204 |
| 6,672,639 | B2 * | 1/2004 | Kosuge et al. | 296/37.2 |
| 6,929,315 | B2 * | 8/2005 | Kim | 296/204 |
| 6,945,594 | B1 * | 9/2005 | Bejin et al. | 296/193.07 |
| 7,059,667 | B2 * | 6/2006 | Tomita | 296/203.03 |
| 7,083,225 | B2 * | 8/2006 | Yakata et al. | 296/203.04 |
| 7,163,259 | B2 * | 1/2007 | Hayashi | 296/204 |
| 2003/0071490 | A1 * | 4/2003 | Nishikawa et al. | 296/203.04 |
| 2003/0102696 | A1 * | 6/2003 | Matsuoka | 296/203.04 |

FOREIGN PATENT DOCUMENTS

| | | |
|---|---|---|
| JP | 01-087969 | 9/1989 |
| JP | 08-113163 | 5/1996 |
| JP | 10-129533 | 5/1998 |
| JP | 2001-30951 | 2/2001 |
| JP | 2004-345625 | 12/2004 |

OTHER PUBLICATIONS

Written Opinion of the ISR.
Japanese Office Action issued on Mar. 24, 2009.

* cited by examiner

REAR STRUCTURE OF VEHICLE

BACKGROUND OF THE INVENTION

1. Field of the Invention

The invention generally relates to a rear structure of a vehicle, and more particularly, to a rear structure in which a lower back reinforcement member reinforces a lower back panel, and a rear floor side member reinforces a rear floor panel.

2. Description of the Related Art

In Japanese Patent Application Publication No. 2001-30951 (JP-A-2001-30951), a rear structure of a vehicle is described in which a gusset connects a lower back panel and a rear floor side member.

However, in the rear structure of the vehicle described in JP-A-2001-30951, the gusset only connects the lower back panel and the rear floor side member in a longitudinally and vertically oblique direction. Thus, the rear structure of the vehicle lacks rigidity against any collision load that may be applied obliquely to the rear of the vehicle from the left or right.

SUMMARY OF THE INVENTION

The present invention provides a vehicle rear structure that increases rigidity against any collision load from the oblique left or right rear of the vehicle.

In one aspect of the invention, a rear structure of a vehicle is provided that includes a lower back panel provided at the rear of the vehicle, and a lower back reinforcement member that is provided in front of the lower back panel and reinforces the lower back panel. A rear floor panel that is provided in front of the lower back panel, and a rear floor side member reinforces the rear floor panel. A first connecting portion connects the lower back reinforcement member and the rear floor side member in a laterally and longitudinally oblique direction of the vehicle. The first connecting portion may be located above or below the rear floor panel.

According to the aspect of the present invention, the change in the horizontal angle formed by the lower back reinforcement member and the rear floor side member is reduced when an oblique (left or right) rear collision load is applied to the vehicle. Thus, the rigidity against such a collision load is improved.

In the rear structure of the vehicle, the first connecting portion may be separate from the lower back reinforcement member and the rear floor side member.

Accordingly, the complexity of the structure of the lower back reinforcement member and the rear floor side member can be reduced. In addition, the lower back reinforcement member and the rear floor side member do not require significant structural changes from the conventional members.

Alternatively, the first connecting portion may be integrally formed with at least one of the lower back reinforcement member and the rear floor side member.

Accordingly, any increase in weight of vehicle body may be minimized.

In the rear structure of the vehicle, at least one of the lower back reinforcement member and the rear floor side member may be connected to the first connecting portion in the vertical direction of the vehicle.

Accordingly, the first connecting portion effectively connects the lower back reinforcement member and the rear floor side member. Thus, the change in the horizontal angle formed by the lower back reinforcement member and the rear floor side member is effectively reduced when an oblique rear collision load is applied to the vehicle.

The rear structure of the vehicle may further include a second connecting portion that connects the lower back reinforcement member to the rear floor side member, and the second connecting portion and the rear floor panel may be integrally formed.

Accordingly, the change in the horizontal angle formed by the lower back reinforcement member and the rear floor side member is further reduced when an oblique rear collision load is applied to the vehicle.

Alternatively, the second connecting portion may be provided separately from the rear floor panel.

Accordingly, the loss of productivity in manufacturing the rear floor panel can be minimized.

The rear structure of the vehicle may further include a spare tire storage well in the rear floor panel. The second connecting member may be formed by decreasing the lateral width of the spare tire storage well around the rear end of the vehicle.

Accordingly, while the spare tire storage well provides enough space to store a spare tire, the second connecting portion can be provided on the rear floor panel.

In the rear structure of the vehicle, the second connecting portion may be connected to at least one of the lower back reinforcement member and the rear floor side member in a vertical direction of the vehicle.

Accordingly, the second connecting portion effectively connects the lower back reinforcement member to the rear floor side member. Thus, the change in the horizontal angle between the lower back reinforcement member and the rear floor side member is reduced more effectively when an oblique rear collision load is applied to the vehicle.

The rear structure of the vehicle may further include a rear floor crossmember that is located in front of the lower back panel and reinforces the rear floor panel, and a third connecting portion that connects the rear floor side member and the rear floor crossmember in a laterally and longitudinally oblique direction of the vehicle. The third connecting portion may be located above or below the rear floor panel.

Accordingly, the rear floor crossmember effectively absorbs a collision load applied to the vehicle from an oblique rear direction. Thus, the rigidity against such a collision load is further improved.

In the rear structure of the vehicle, the third connecting portion may be provided separately from the rear floor side member and the rear floor crossmember.

Accordingly, the complexity of the structure of the rear floor side member and the rear floor crossmember can be suppressed. In addition, the rear floor side member and the rear floor crossmember do not require significant structural changes from the conventional members.

Alternatively, the third connecting portion may be integrally formed with at least one of the rear floor side member and the rear floor crossmember.

Accordingly, any increase in weight of the vehicle body may be minimized.

In the rear structure of the vehicle, the third connecting member may be connected to at least one of the rear floor side member and the rear floor crossmember in the vertical direction of the vehicle.

Accordingly, the third connecting portion effectively connects the rear floor side member and the rear floor crossmember. Thus, the rear floor crossmember effectively absorbs the collision load applied to the vehicle from the oblique rear direction of the vehicle.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
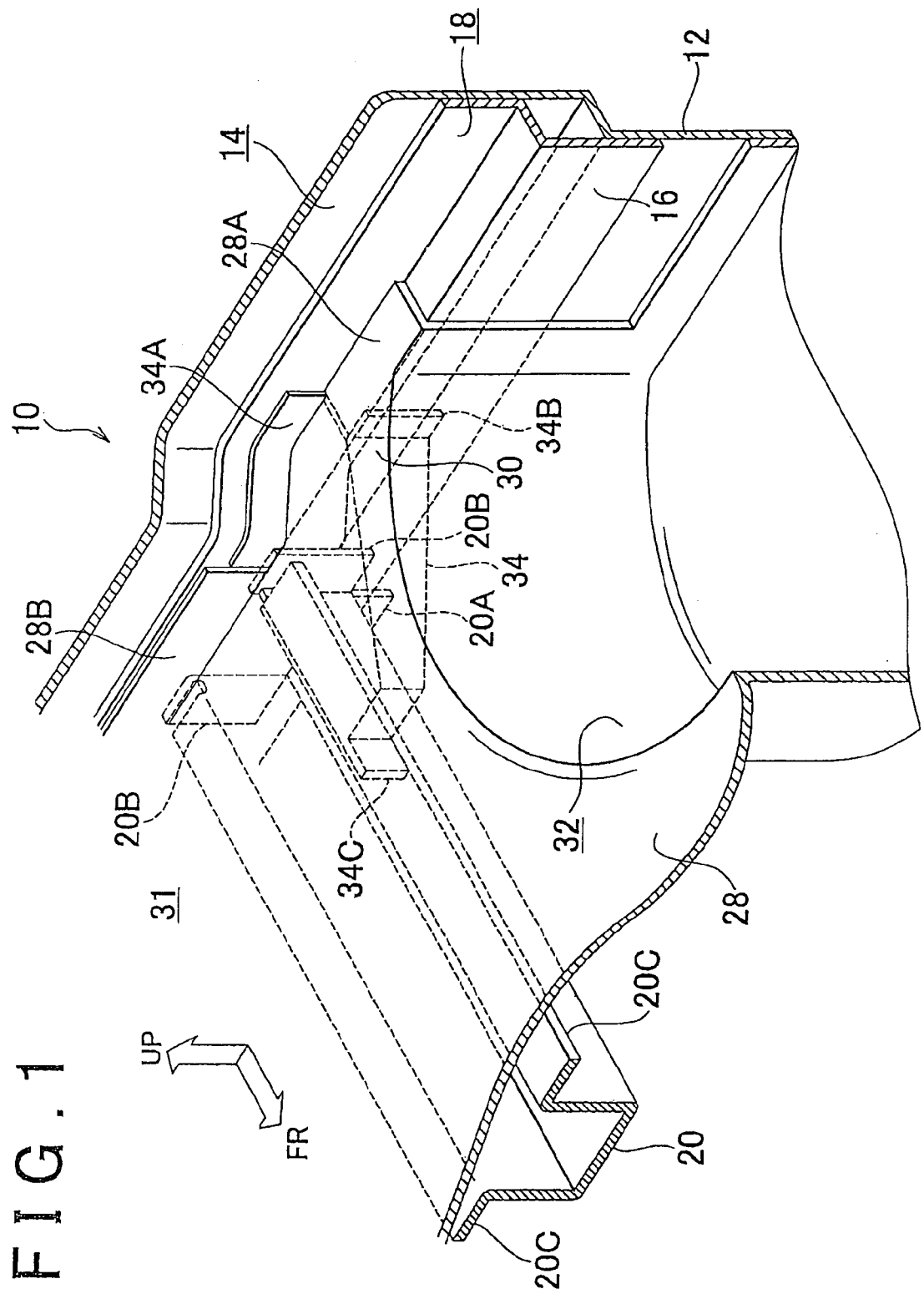
FIG. 1 is a perspective view illustrating a right side rear structure of a vehicle as viewed from the front left of the vehicle according to a first embodiment of the present invention.
Figure 2:
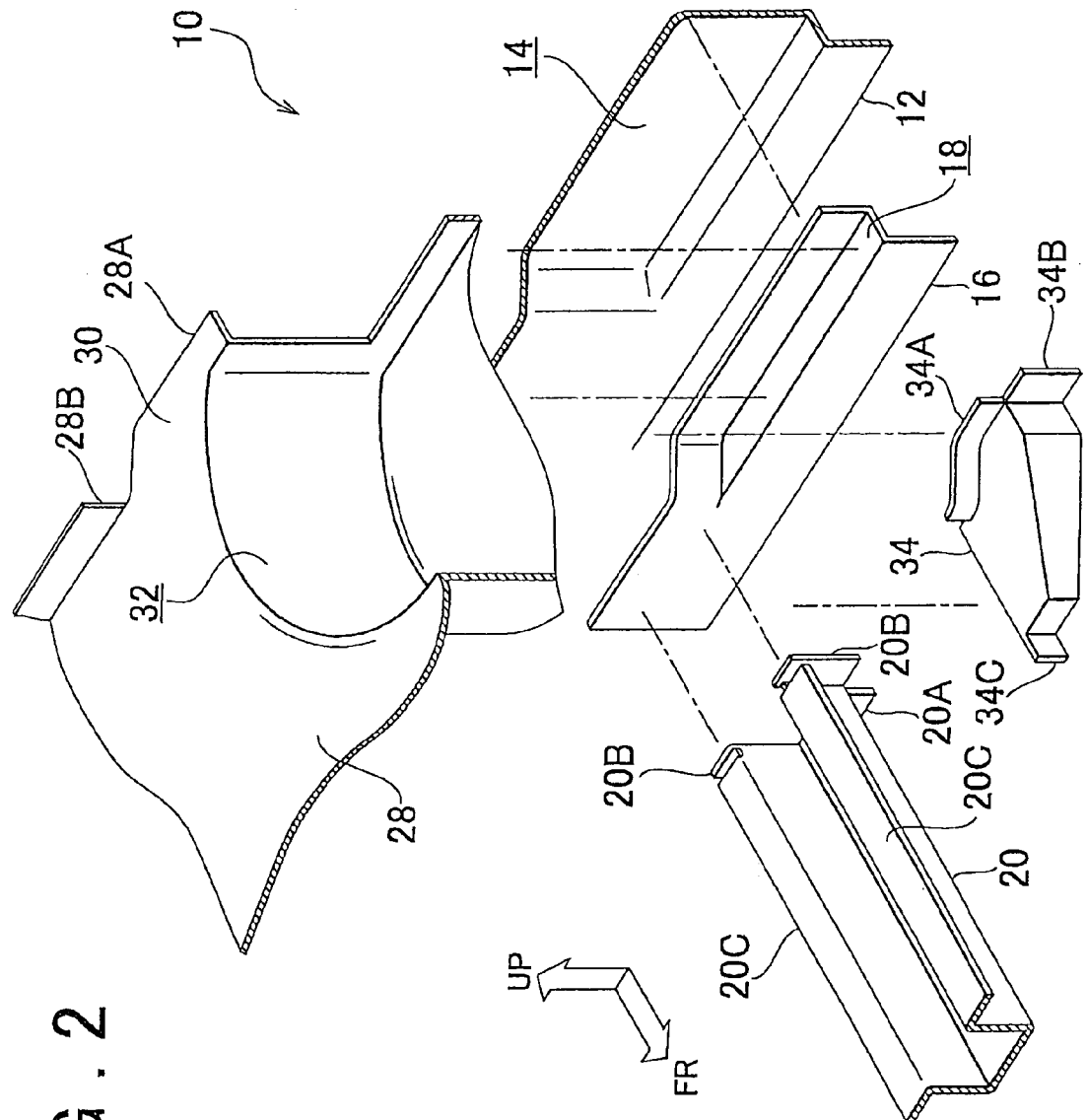
FIG. 2 is an exploded perspective view illustrating the right side rear structure of the vehicle as viewed from the front left of the vehicle according to the first embodiment of the present invention.
Figure 3:
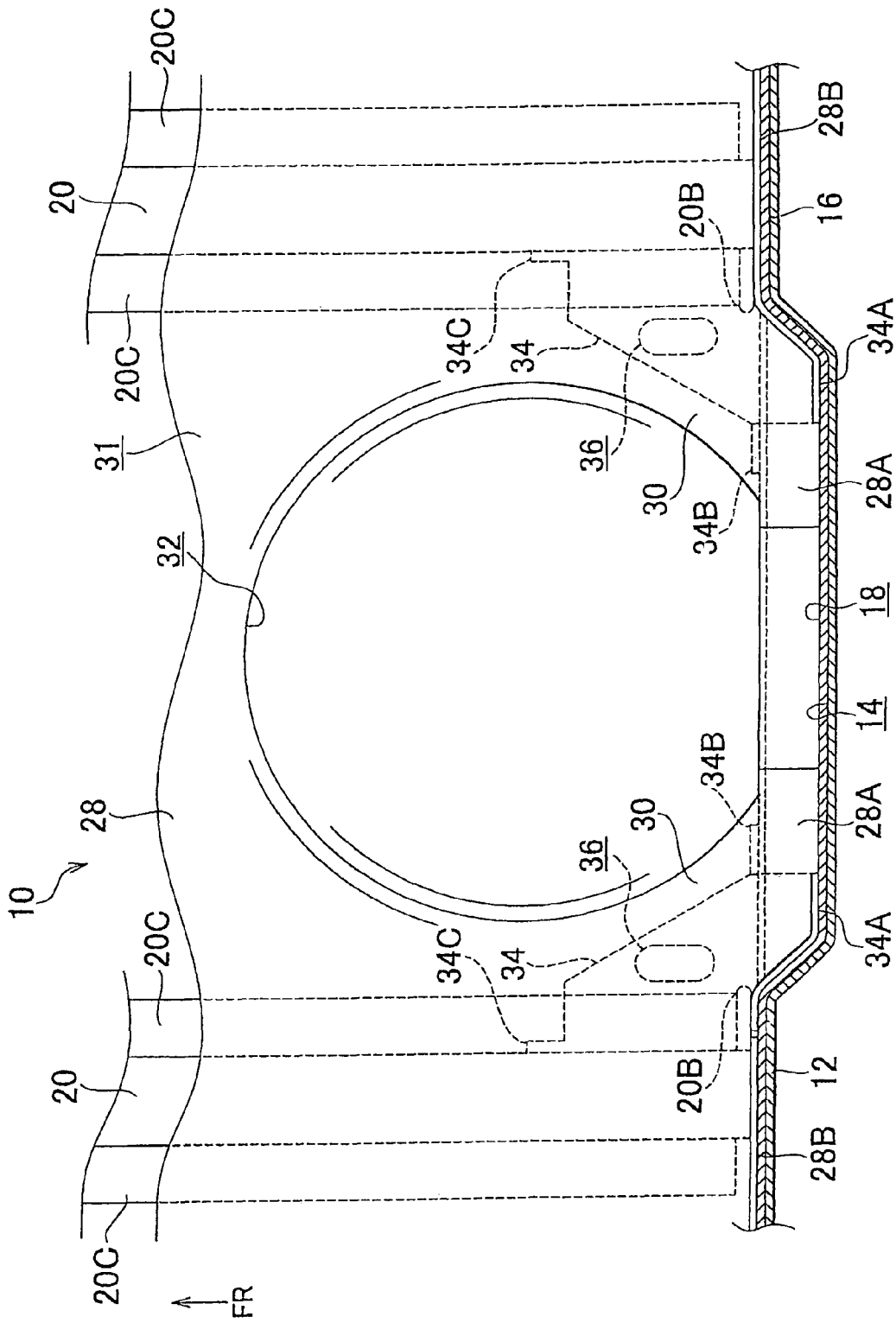
FIG. 3 is a plan view illustrating the rear structure of the vehicle as viewed from above the vehicle according to the first embodiment of the present invention.
Figure 4:
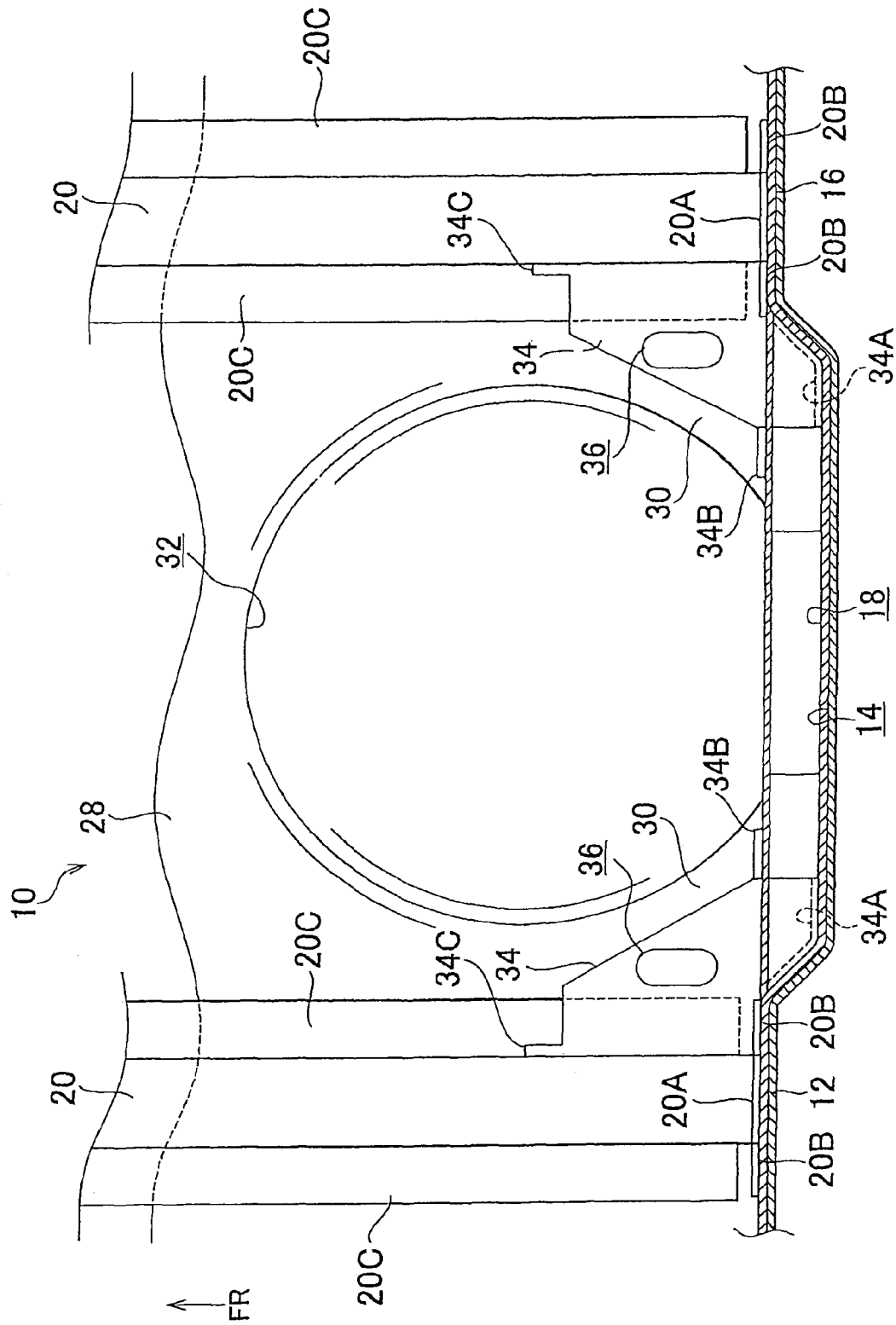
FIG. 4 is a bottom view illustrating the rear structure of the vehicle as viewed from below the vehicle according to the first embodiment of the present invention.

FIG. 1 is a perspective view illustrating the right side rear structure 10 of a vehicle according to a first embodiment of the present invention as viewed from the front left of the vehicle. FIG. 2 is an exploded perspective view illustrating the right side rear structure 10 of the vehicle viewed from the front left of the vehicle. FIG. 3 is a plan view illustrating the rear structure 10 of the vehicle as viewed from above the vehicle. FIG. 4 is a bottom view illustrating the rear structure of the vehicle as viewed from below the vehicle. In the figures, the arrows FR and UP respectively represent the front and upside of the vehicle.

The vehicle rear structure 10 of this embodiment includes a lower back panel 12, which forms the lower rear portion of the vehicle body and is perpendicular to the longitudinal direction of the vehicle. A positioning recessed portion 14, which is a generally rectangular parallelepiped recess, is formed about the lateral center of the lower back panel 12. The positioning recessed portion 14 of the lower back panel 12 is recessed rearward.

A lower back reinforcement 16, which is an example of a lower back reinforcement member, is provided longitudinally forward of the lower back panel 12, and is perpendicular to the longitudinal direction of the vehicle. A joining recessed portion 18, in which a generally rectangular parallelepiped recess is formed at the upper end and about the lateral center of the lower back reinforcement 16. The joining recessed portion 18 of the lower back reinforcement 16 is recessed rearward, and is enclosed with a right wall, left wall, rear wall and bottom wall. The upper surface of the joining recessed portion 18 is an open end. The right wall, left wall and rear wall of the joining recessed portion 18 of the lower back reinforcement 16 are connected to the positioning recessed portion 14 of the lower back panel 12. In addition, portions of the lower back reinforcement 16 other than the positioning recessed portion 14 are also connected to the lower back panel 12. Accordingly, the lower back reinforcement 16 is connected to the lower back panel 12 so that the bottom wall of the joining recessed portion 18 is above and apart from the bottom wall of the positioning recessed portion 14. Thus, the lower back reinforcement 16 reinforces the lower back panel 12.

Rear floor side members 20 are located longitudinally forward of the lower back reinforcement 16 on the left and right sides of the vehicle. Each rear floor side member 20 has a generally U-shape in cross-section with an open-ended top surface and extends longitudinally. A lower bent portion 20A and a pair of side bent portions 20B are provided at the rear end of each rear floor side member 20. The lower bent portion 20A is bent downward from the bottom wall of the rear floor side member 20. The side bent portions 20B are bent outward from the respective sidewalls of the rear floor side member 20. The lower bent portion 20A and the pair of side bent portions 20B are attached to the lower back reinforcement 16. Thus, the rear floor side members 20 are connected to the lower back reinforcement 16 and to the lower back panel 12 via the lower back reinforcement 16. A pair of upper bent portions 20C is provided at the upper end of the rear floor side member 20. The pair of upper bent portions 20C is bent outward from the respective sidewalls of the rear floor side member 20.

Figure 5:
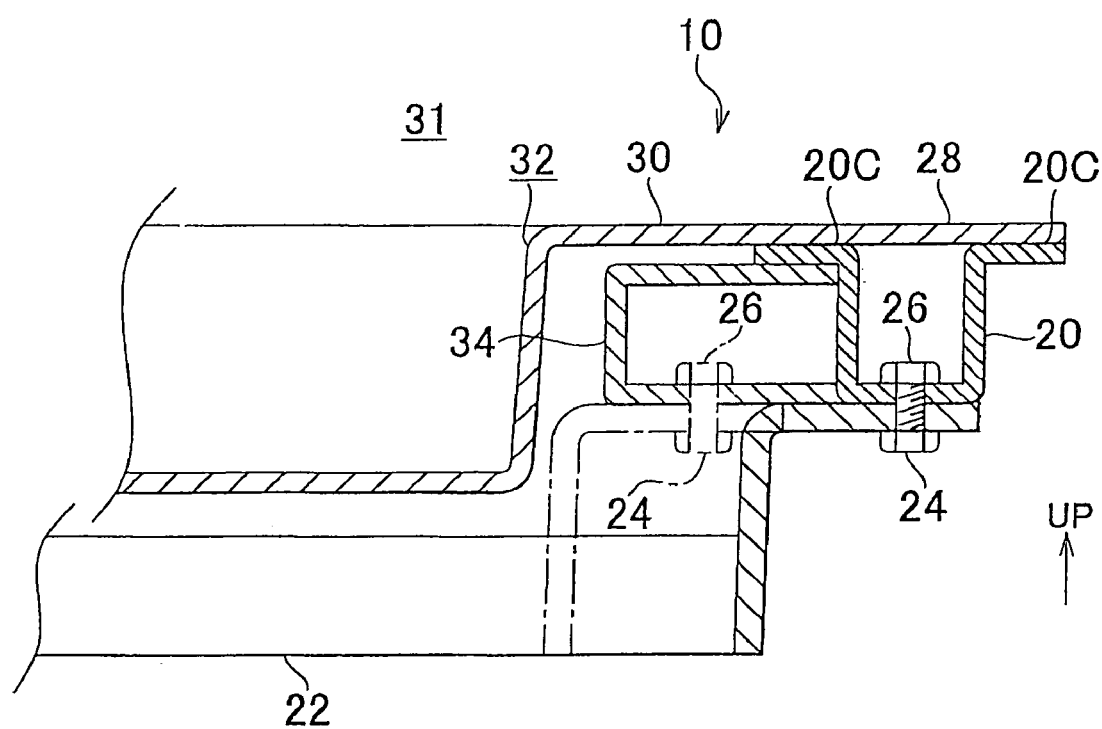
FIG. 5 is a cross section illustrating a connection condition of the hitch member in the right side rear structure of the vehicle as viewed from the rear of the vehicle according to the first embodiment of the present invention.

As shown in FIG. 5, a long shaft-like hitch member 22 extends between the two rear floor side members 20. Each end of the hitch member 22 is secured by a bolt and nut to the rear end of the bottom wall of the rear floor side member 20. The vehicle can tow, or be towed by, another vehicle, if another vehicle is connected to the hitch member 22.

A rear floor panel 28 is located longitudinally forward of the lower back reinforcement 16. The rear floor panel 28 extends generally horizontally and forms the floor of a vehicle interior 31 (e.g., the trunk at the rear of the vehicle). A pair of center extended portions 28A and a pair of side extended portions 28B are provided at the rear end of the rear floor panel 28. The center extended portions 28A are located around the lateral center of the rear floor panel 28 and extend rearwards from the rear end of the rear floor panel 28. The side extended portions 28B are bent upward from the left rear and right rear ends of the rear floor panel 28. The center extended portions 28 are connected to the bottom wall of the joining recessed portion 18 of the lower back reinforcement 16. The side extended portions 28B are connected to the lower back panel 12 and the lower back reinforcement 16. Thus, the rear floor panel 28 is connected to the lower back panel 12 and the lower back reinforcement 16. In addition, the rear floor panel 28 is connected to the pair of upper bent portions 20C of the rear floor side members 20. Thus, the rear floor panel 28 is connected to the rear floor side member 20, and is thus reinforced by the rear floor side member 20. As described above, the rear floor panel 28 connects the joining recessed portion 18 of the lower back reinforcement 16 and the rear portion of the rear floor side member 20 in an oblique direction that extends longitudinally forward and laterally outward from the rear end of the vehicle. The connecting portion of the rear floor panel 28 is a shared panel 30, which may be an example of a second connecting portion.

A downward recess may be formed in the rear floor panel 28 near the lateral central area to form a spare tire storage well 32. The spare tire storage well 32 has a generally cylindrical shape and a spare tire (not shown) of the vehicle is stored therein. Because the shared panel 30 is provided, the lateral width of the spare tire storage well 32 at a rear side area gradually decreases toward the rear end of the vehicle. The rear floor panel 28, which forms the sidewall of the spare tire storage well 32 near the rear end of the vehicle, is a curved plate and connects to the lower back panel 12 and the lower back reinforcement 16. Thus, the rear floor panel 28, lower back panel 12 and the lower back reinforcement 16 form the rear end of the spare tire storage well 32.

A gusset 34, which is pillar-like (or box-shaped) and generally trapezoidal in cross-section, is provided under the rear floor panel 28. The gusset 34 may be an example of a first connecting portion. The rear surface and the lateral outside surface of the gusset 34 are open. In addition, the upper wall of the gusset 34 extends onto the joining recessed portion 18 of the lower back reinforcement 16. An upper connecting portion 34A is provided at the rear end of the gusset 34. The upper connecting portion 34A is bent upward from the upper wall of the gusset 34. A rear connecting portion 34B and a front connecting portion 34C of the gusset 34 are respectively provided at the rear end and the front end of the gusset 34. The rear connecting portion 34B is bent laterally inboard from the lateral inboard wall of the gusset 34. The front connecting portion 34C is bent longitudinally forward from the front wall of the gusset 34.

The upper wall of the gusset 34 is connected to the bottom wall of the joining recessed portion 18 of the lower back reinforcement 16, the inboard upper bent portion 20C of the rear floor side member 20, and the rear floor panel 28, including the center extended portion 28A. In addition, the upper connecting portion 34A of the gusset 34 is connected to the lower back reinforcement 16, including the sidewall of the joining recessed portion 18, and the lower back panel 12, including the sidewall of the positioning recessed portion 14. Further, the rear connecting portion 34B and the front connecting portion 34C of the gusset 34 are respectively connected to the lower back panel 12 and the lateral inboard sidewall of the rear floor side member 20. Thus, the gusset 34 connects the lower back reinforcement 16 and the rear floor side member 20 in an oblique direction that extends longitudinally forward and laterally outward of the vehicle. Further, the gusset 34 is connected to the rear floor panel 28.

The bottom wall of the gusset 34 has a rear hook hole 36, which is a through-hole bored in the bottom wall of the gusset 34. The vehicle can tow, or be towed by, another vehicle, if another vehicle is hooked into the rear hook hole 36 of the gusset 34.

In the rear structure 10 of the vehicle described above, the lower back reinforcement 16 is located longitudinally forward of the lower back panel 12. The gusset 34, which is located under the rear floor panel 28, connects the lower back reinforcement 16 and the rear floor side member 20 in an oblique direction extending longitudinally forward and laterally outward of the vehicle. Accordingly, if a collision load is applied to the vehicle from an oblique rear direction, the change in horizontal angle formed by the lower back reinforcement 16 and the rear floor side member 20 is suppressed. Thus, the rigidity against such a collision load is increased. In addition, the improvement of the rigidity of the rear floor panel 28 also reduces vibrations and vehicle noises and improves steering stability.

In addition, the upper wall of the gusset 34 is connected vertically to the bottom wall of the joining recessed portion 18 of the lower back reinforcement 16 and the inboard upper bent portion 20C of the rear floor side member 20. Thus, the gusset 34 effectively connects the lower back reinforcement 16 and the rear floor side member 20. Accordingly, when a collision load is applied to the vehicle from an oblique rear direction, the change in horizontal angle formed by the lower back reinforcement 16 and the rear floor side member 20 is also effectively suppressed.

Further, the gusset 34 is provided separately from the lower back reinforcement 16 or the rear floor side member 20. Thus, the structural complexity of the lower back reinforcement 16 and the rear floor side member 20 is minimized. In addition, the lower back reinforcement 16 and the rear floor side member 20 do not require significant structural changes from those conventionally used. Accordingly, the loss of productivity in manufacturing the lower back reinforcement 16 and the rear floor side member 20 can be minimized.

Further, the shared panel 30 of the rear floor panel 28 connects the lower back reinforcement 16 and the rear floor side member 20 in an oblique direction extending longitudinally forward and laterally outward of the vehicle. Accordingly, when a collision load is applied to the vehicle from an oblique rear direction, the change in horizontal angle formed by the lower back reinforcement 16 and the rear floor side member 20 is further suppressed.

In addition, the shared panel 30 of the rear floor panel 28 is connected vertically to the bottom wall of the joining recessed portion 18 of the lower back reinforcement 16 and to the pair of upper bent portions 20C of the rear floor side member 20. Thus, the rear floor panel 28 effectively connects the lower back reinforcement 16 and the rear floor side member 20. The rigidity of the rear floor panel 28 is effectively improved. Accordingly, when a collision load is applied to the vehicle from an oblique rear direction, the change in horizontal angle formed by the lower back reinforcement 16 and the rear floor side member 20 is more effectively suppressed.

Further, the shared panel 30 of the rear floor panel 28 is provided by reducing the lateral width of the rear portion of the spare tire storage well 32 toward the rear end of the vehicle. In other words, the shared panel 30 is disposed to an area, which would otherwise be a gap between the sidewall of the spare tire storage well 32 and a spare tire if the sidewall of the spare tire storage well 32 were to extend in the longitudinal direction of the vehicle (without curving) toward the rear end of the vehicle. Accordingly, while the spare tire storage well 32 has sufficient space to store the spare tire, the shared panel 30 can be provided in the rear floor panel 28.

Furthermore, as described above, the gusset 34 and the shared panel 30 of the rear floor panel 28 are connected to the lower back reinforcement 16 and the rear floor side member 20 in an oblique direction extending longitudinally forward and laterally outward of the vehicle. Thus, shearing deformation and/or twisting deformation of the rear floor side member 20 and the gusset 34 is suppressed. Accordingly, the measure to improve rigidity of the vehicle body required when the vehicle tows, or is towed by, another vehicle by using the hitch member 22 may be reduced. As shown with a dashed line in FIG. 5, each end of the hitch member 22 may be fixed to the gusset 34, instead of the rear floor side member 20.

Further, when the vehicle tows, or is towed by, another vehicle by hooking another vehicle into the rear hook hole 36 in the gusset 34. Accordingly, a separate hook for towing or being towed by another vehicle is not necessary. Thus, the cost and weight can be reduced.

Figure 6:
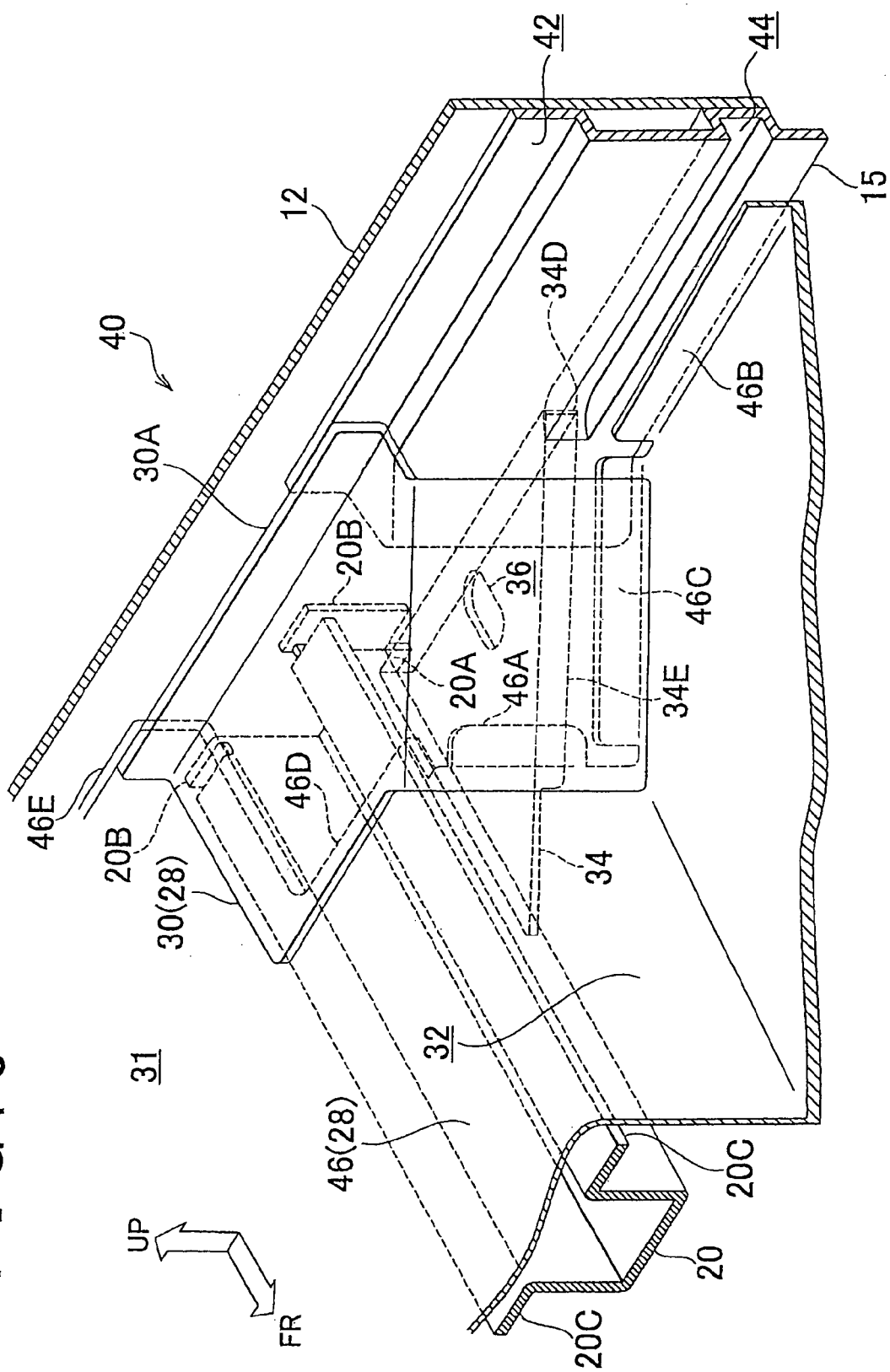
FIG. 6 is a perspective view illustrating a right side rear structure of a vehicle as viewed from the front left of the vehicle according to a second embodiment of the present invention.
Figure 7:
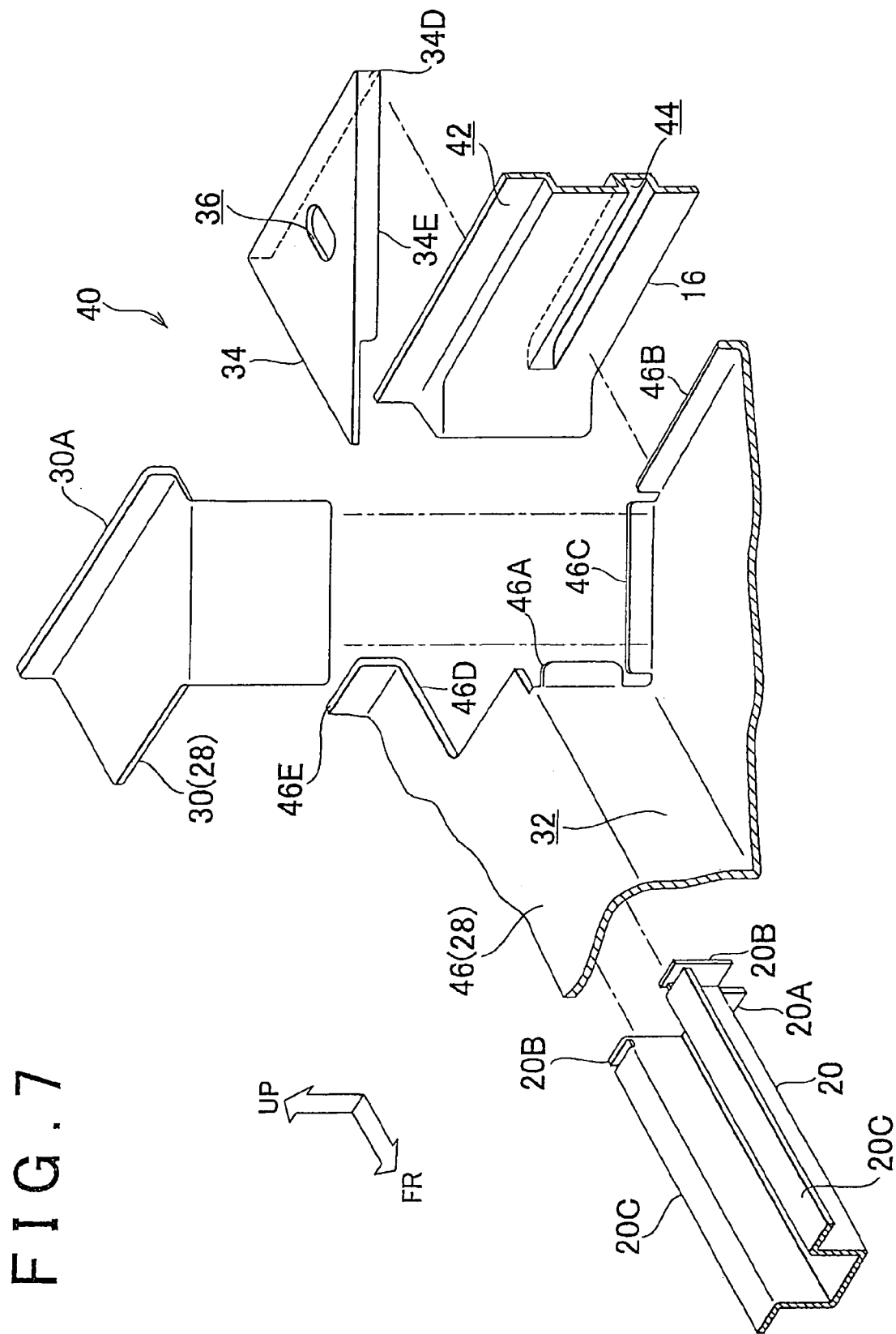
FIG. 7 is an exploded perspective view illustrating the right side rear structure of the vehicle as viewed from the front left of the vehicle according to the second embodiment of the present invention.

FIG. 6 is a perspective view illustrating the right side rear structure 40 of the vehicle as viewed from the front left of the vehicle according to the second embodiment of the present invention. FIG. 7 is an exploded perspective view illustrating a main portion of the right side rear structure 40 of the vehicle as viewed from the front left of the vehicle.

The rear structure 40 of the vehicle according to the second embodiment is similar to that of the first embodiment; however, the following portions are different.

In the vehicle rear structure 40 of the second embodiment, the positioning recessed portion 14 in the first embodiment is not formed around the lateral center of the lower back panel 12.

The lower back reinforcement 16 is provided only around the lateral center of the vehicle. Each lateral end of the lower back reinforcement 16 gradually curves forward as it goes to the side of the vehicle. A generally rectangular parallelepiped rearward recess is formed in the upper portion of the lower back reinforcement 16 to form an upper joining recessed portion 42. The upper end surface of the upper joining recessed portion 42 is open. A middle joining recessed portion 44, which is a generally rectangular parallelepiped groove, is formed around the vertically middle area of the lower back reinforcement 16. The middle joining recessed portion 44 is not provided at each lateral end of the lower back reinforcement 16. The rearward recess is formed in the lower back reinforcement 16 at the position of the middle joining recessed portion 44.

The sidewall of the upper joining recessed portion 42 and the sidewall of the middle joining recessed portion 44 of the lower back reinforcement 16 are connected to the lower back panel 12. Thus, the lower back reinforcement 16 reinforces the lower back panel 12.

The lower bent portion 20A and the pair of side bent portions 20B of the rear floor side member 20 are connected to the lower back panel 12. Thus, the rear floor side member 20 is connected to the lower back panel 12.

The rear floor panel 28 is formed by connecting each of the rear left and rear right ends of the rear floor panel body 46 to a separate shared panel 30.

The spare tire storage well 32, which is located around the lateral center of the rear floor panel 28, is formed of the rear floor panel body 46, with the exception of the rear and intermediate sidewall of the spare tire storage well 32. As shown in FIG. 6, the intermediate sidewall is an oblique portion of the sidewall of the spare tire storage well 32 that connects the rear sidewall, formed of the lower back reinforcement 16, and the sidewall, formed of the rear floor panel body 46. In other words, the rear floor panel body 46 is not provided to form the sidewall of the spare tire storage well at and around the rear end of the vehicle. The sidewall (a portion formed of the rear floor panel body 46 near the rear end) of the spare tire storage well 32 is disposed perpendicularly with respect to the lateral direction of the vehicle. The rear end of the rear floor panel body 46 that forms the sidewall of the spare tire storage well 32 is bent inboard and forms a vertical attachment portion 46A.

The rear end of the bottom wall of the spare tire storage well 32 forms a trapezoidal extended portion. A center attachment portion 46B and a pair of side attachment portions 46C are provided at the outer periphery (circumference) of the extended portion. The center attachment portion 46B is bent upward from the lateral center area of the extended portion. The side attachment portions 46C are respectively bent upward from left and right sides of the extended portion.

The rear end of the rear floor panel body 46 is open on the left and right sides (laterally outside) of the spare tire storage well 32. An L-shaped peripheral attachment portion 46D is provided at the periphery of the open end of the rear floor panel body 46. An end extended portion 46E is provided at the rear end of the rear floor panel body 46 and on the lateral outside portion of the peripheral attachment portion 46D. The end extended portion 46E is bent upward from the rear floor panel body 46.

The center attachment portion 46B and the side attachment portion 46C are connected to the lower portion of the lower back reinforcement 16. The end extended portion 46E is connected to the lower back panel 12. Thus, the rear floor panel body 46 is connected to the lower back panel 12 and the lower back reinforcement 16, which defines the rear sidewall of the spare tire storage well 32. The rear floor panel body 46 is connected to the pair of upper bent portions 20C of the rear floor side member 20. Thus, the rear floor panel body 46 is connected to the rear floor side member 20 and is reinforced by the rear floor side member 20.

The shared panel 30 of the rear floor panel 28 has an L-shaped cross-section. The upper wall of the shared panel 30 has a trapezoidal shape and extends generally horizontally. The sidewall of the shared panel 30 is generally rectangular and extends generally vertically. An upper extended portion 30A is provided at the rear end of the shared panel 30. The upper extended portion 30A is bent upward from the upper wall of the shared panel 30.

The upper wall of the shared panel 30 is connected to the bottom wall of the upper joining recessed portion 42 of the lower back reinforcement 16, the peripheral attachment portion 46D of the rear floor panel body 46, and the pair of upper bent portions 20C of the rear floor side member 20. The upper extended portion 30A of the shared panel 30 is connected to the lower back panel 12, the sidewall of the upper joining recessed portion 42 of the lower back reinforcement 16, and the end extended portion 46E of the rear floor panel body 46. In addition, the sidewall of the shared panel 30 is connected to the lateral end of the lower back reinforcement 16, and the vertical attachment portion 46A and the side attachment portion 46C of the rear floor panel body 46. Thus, the shared panel 30 is connected to the lower back panel 12, the lower back reinforcement 16, rear floor side member 20 and the rear floor panel body 46. Accordingly, the rear floor side member 20 reinforces the shared panel 30. Further, the shared panel 30 connects the lateral end of the lower back reinforcement 16 and the rear end portion of the rear floor side member 20 in an oblique direction that extends longitudinally forward and laterally outward. In addition, the sidewall of the shared panel 30 forms part of the sidewall of the spare tire storage well 32 near the rear of the vehicle.

The gusset 34 is a generally triangular plate. The gusset 34 includes the rear hook hole (through-hole) 36 therein, similar to that of the first embodiment. A rear attachment portion 34D and a front attachment, portion 34E are respectively provided at the rear end and front end of the gusset 34. The rear attachment portion 34D and the front attachment portion 34E are bent downward from the gusset 34.

The gusset 34 is connected to the bottom wall of the rear floor side member 20. The rear attachment portion 34D of the gusset 34 is connected to the lower back panel 12 and the lower bent portion 20A of the rear floor side member 20. The front attachment portion 34E is connected to the lateral end and the sidewall of the lower attachment recessed portion 44 of the lower back reinforcement 16, to the vertical attachment portion 46A of the rear floor panel body 46 and to the sidewall of the shared panel 30. Thus, the gusset 34 connects the lateral end of the lower back reinforcement 16 and the rear end portion of the rear floor side member 20 in an oblique direction extending longitudinally forward and laterally outward of the vehicle.

According to the second embodiment of the present invention, the merits and advantages similar to those of the first embodiment can be achieved except for the merits and advantages achieved by forming the shared panel 30 and the rear floor panel 28 integrally.

In the second embodiment, the shared panel 30 is provided separately from the rear floor panel 28. The rear portion of the sidewall of the spare tire storage well 32, is formed by bending the rear floor panel body 46 and the shared panel 30. Thus, it is not necessary to draw the rear floor panel 28 to form the rear portion of the sidewall of the spare tire storage well 32. Accordingly, the loss of productivity in manufacturing the rear floor panel 28 can be minimized. In addition, the increase in cost and size of the rear floor panel 28, necessary to compensate for the difficulty of drawing compound, may be kept to a minimum.

Figure 8:
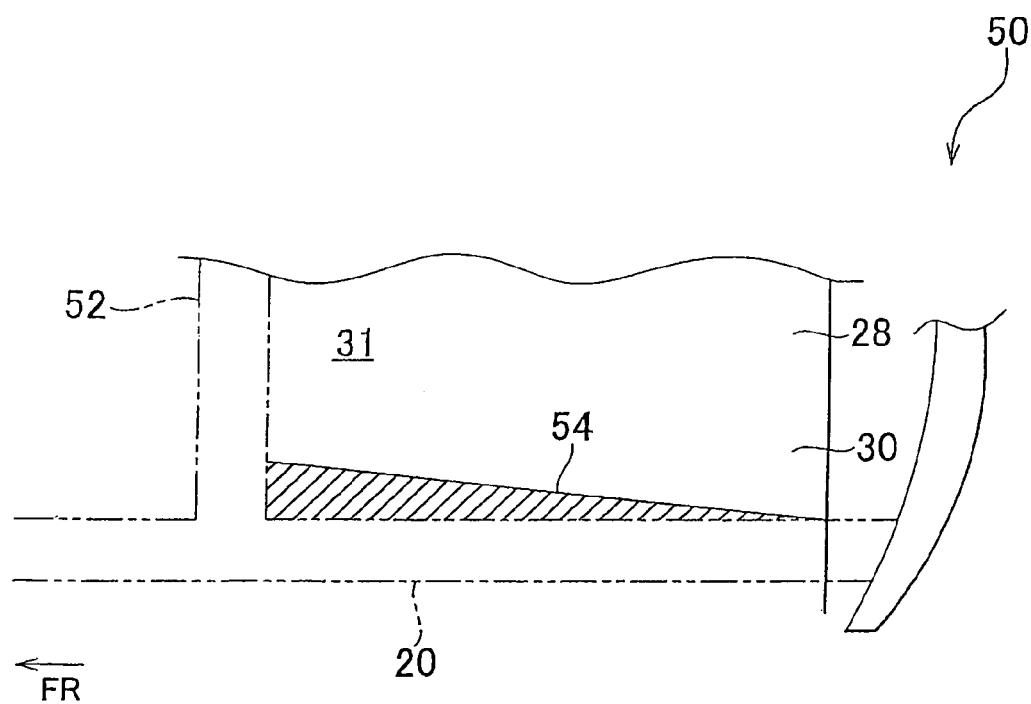
FIG. 8 is a plan view illustrating a left side rear structure of the vehicle as viewed from above the vehicle according to a third embodiment of the present invention.
Figure 9:
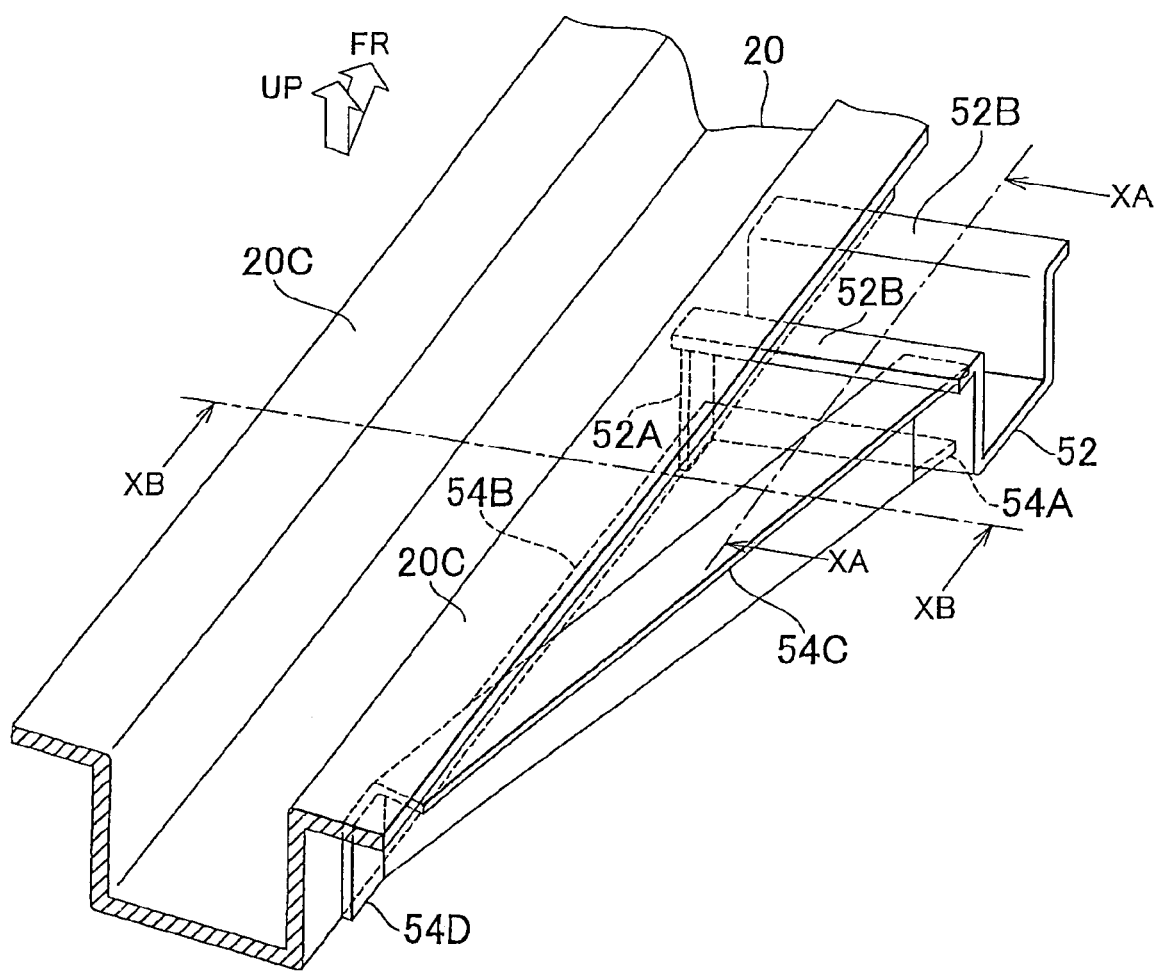
FIG. 9 is a perspective view illustrating a main portion of the left side rear structure of the vehicle as viewed from the rear right of the vehicle according to the third embodiment of the present invention.
Figure 10A:
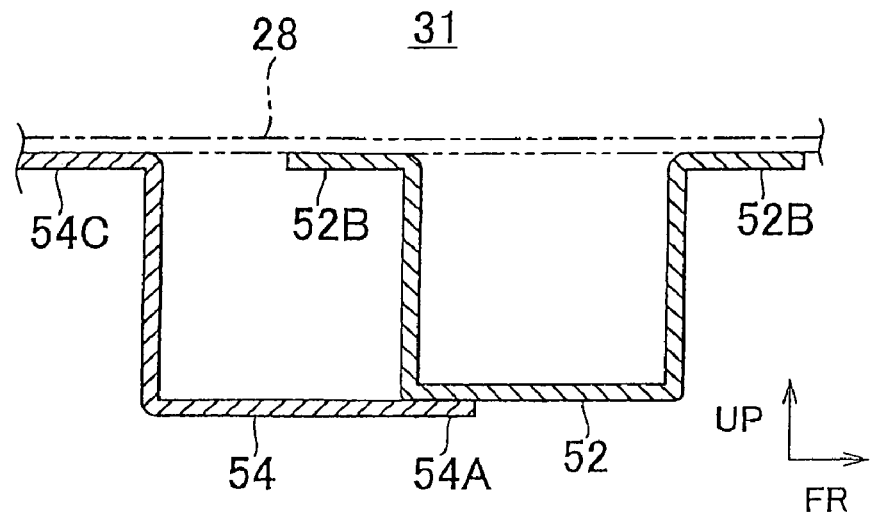
FIG. 10A is a cross section illustrating the left side rear structure of the vehicle taken on line XA-XA of FIG. 9 according to the third embodiment of the present invention.
Figure 10B:
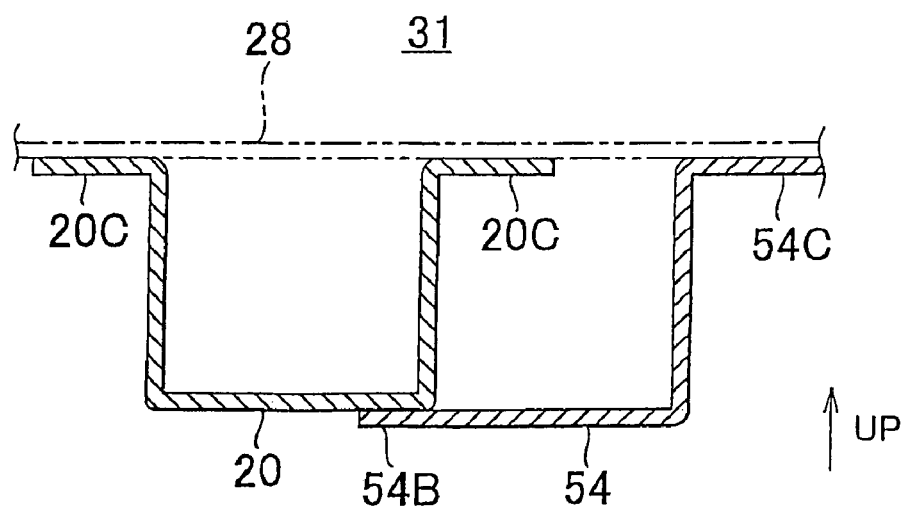
FIG. 10B is a cross section illustrating the left side rear structure of the vehicle taken on line XB-XB of FIG. 9 according to the third embodiment of the present invention.

FIG. 8 is a plan view illustrating a left side rear structure of the vehicle as viewed from above the vehicle according to a third embodiment of the present invention. FIG. 9 is a perspective view illustrating a main portion of the left side rear structure of the vehicle as viewed from rear right of the vehicle. Further, FIG. 10A is a cross section illustrating the left side rear structure of the vehicle taken on line XA-XA of FIG. 9. FIG. 10B is a cross section illustrating the left side rear structure of the vehicle taken on line XB-XB of FIG. 9.

In the rear structure 50 of the vehicle according the third embodiment, a rear floor crossmember 52 is provided between the two rear floor side members 20, which are shown in the first or second embodiment, and longitudinally forward of the spare tire storage well 32. The rear floor crossmember 52 has a U-shaped cross-section with an upper open-ended surface, and extends laterally. Each lateral end of the rear floor crossmember 52 has a pair of side bent portions 52A. Each side bent portion 52A is bent outward from each sidewall of the rear floor crossmember 52 and is connected to the sidewall of the rear floor side member 20. A pair of upper bent portions 52B is provided at the upper end of the rear floor crossmember 52. Each upper bent portion 52B is bent outward from the sidewall of the rear floor crossmember 52, and are connected to the lateral inboard upper bent portion 20C of the rear-floor side member 20. Thus, the rear floor crossmember 52 connects the two rear floor side members 20. In addition, the rear floor crossmember 52 is connected to the rear floor panel 28 and reinforces the rear floor panel 28. The first and second embodiments also have the above-described structure.

The rear structure 50 of the vehicle according to the third embodiment is similar to those of first and the second embodiments; however, the following portions are different.

A supplemental gusset 54 having an L-shape in cross-section, which is an example of a third connecting portion, is provided at lateral inboard of the rear floor side member 20 and longitudinally rearward of the rear floor crossmember 52. The supplemental gusset 54 has a triangle bottom wall that extends generally horizontally, and a rectangular sidewall that extends generally vertically. The sidewall of the supplemental gusset 54 extends laterally outward of the vehicle at a predetermined angle (e.g. 10 degrees) from the longitudinal direction of the vehicle as it goes from front to rear.

A front extended portion 54A is provided at the front end of the supplemental gusset 54. The front extended portion 54A extends forwardly from the bottom wall of the supplemental gusset 54. An outer extended portion 54B is provided at the lateral outward end of the supplemental gusset 54. The outer extended portion 54B extends laterally outwardly from the bottom wall of the supplemental gusset 54. An inboard bent portion 54C and a rear extended portion 54D are respectively provided at the upper end and the rear end of the supplemental gusset 54. The inboard bent portion 54C is bent laterally inboard from the sidewall of the supplemental gusset 54. The rear extended portion 54D extends rearward from the sidewall of the supplemental gusset 54.

The front extended portion 54A is connected to the bottom wall of the rear floor crossmember 52. The outer extended portion 54B is connected to the bottom wall of the rear floor side member 20. The inboard bent portion 54C is connected to the rear side upper bent portion 52B of the rear floor crossmember 52, to the lateral inboard upper bent portion 20C of the rear floor side member 20 and to the rear floor panel 28. The rear extended portion 54D is connected to the lateral inboard sidewall of the rear floor side member 20. Thus, the supplemental gusset 54 connects the rear floor side member 20 and the rear floor crossmember 52 in an oblique direction that extends longitudinally forward and laterally inboard (longitudinally rearward and laterally outward). In addition, the supplemental gusset 54 is connected to the rear floor panel 28.

According to the third embodiment of the present invention, the merits and advantages similar to those of the first or second embodiment can be achieved.

In the third embodiment, the supplemental gusset 54 connects the rear floor side member 20 and the rear floor crossmember 52 in an oblique direction that extends longitudinally forward and laterally inboard of the vehicle. Thus, the rear floor crossmember 52, which has a sufficient yield strength margin, appropriately absorbs a collision load applied from an oblique rear direction, in particular, in the direction along the sidewall of the supplemental gusset 54, by effectively dispersing the collision load into the rear floor crossmember 52. Accordingly, the rigidity against such a collision load is further increased. In addition, because the rigidity of the rear floor panel 28 is further increased, the suppression of noise and vibrations and steering stability are further improved.

In addition, the front extended portion 54A of the supplemental gusset 54 is connected vertically to the bottom wall of the rear floor crossmember 52. The outer extended portion 54B of the supplemental gusset 54 is connected vertically to the bottom wall of the rear floor side member 20. The inboard bent portion 54C of the supplemental gusset 54 is connected vertically to the upper bent portion 52B of the rear floor crossmember 52 and the upper bent portion 20C of the rear floor side member 20. Thus, the supplemental gusset 54 effectively connects the rear floor side member 20 and the rear floor crossmember 52. Accordingly, the rear floor crossmember 52 can absorb more effectively any collision load applied to the vehicle from an oblique rear direction.

Further, the supplemental gusset 54 is provided separately from the rear floor crossmember 52 or the rear floor side member 20. Accordingly, the complexity in the structure of the rear floor crossmember 52 and the rear floor side member 20 may be minimized, and the rear floor crossmember 52 and the rear floor side member 20 do not require significant structural changes from the conventional members. Thus, any losses in productivity in manufacturing the rear floor crossmember 52 and the rear floor side member 20 can also be minimized.

Further, the supplemental gusset 54 is located in the space between the rear floor crossmember 52 and the rear floor side member 20, which is not conventionally used. Accordingly, such an unused space is efficiently used to provide the supplemental gusset 54.

Figure 11:
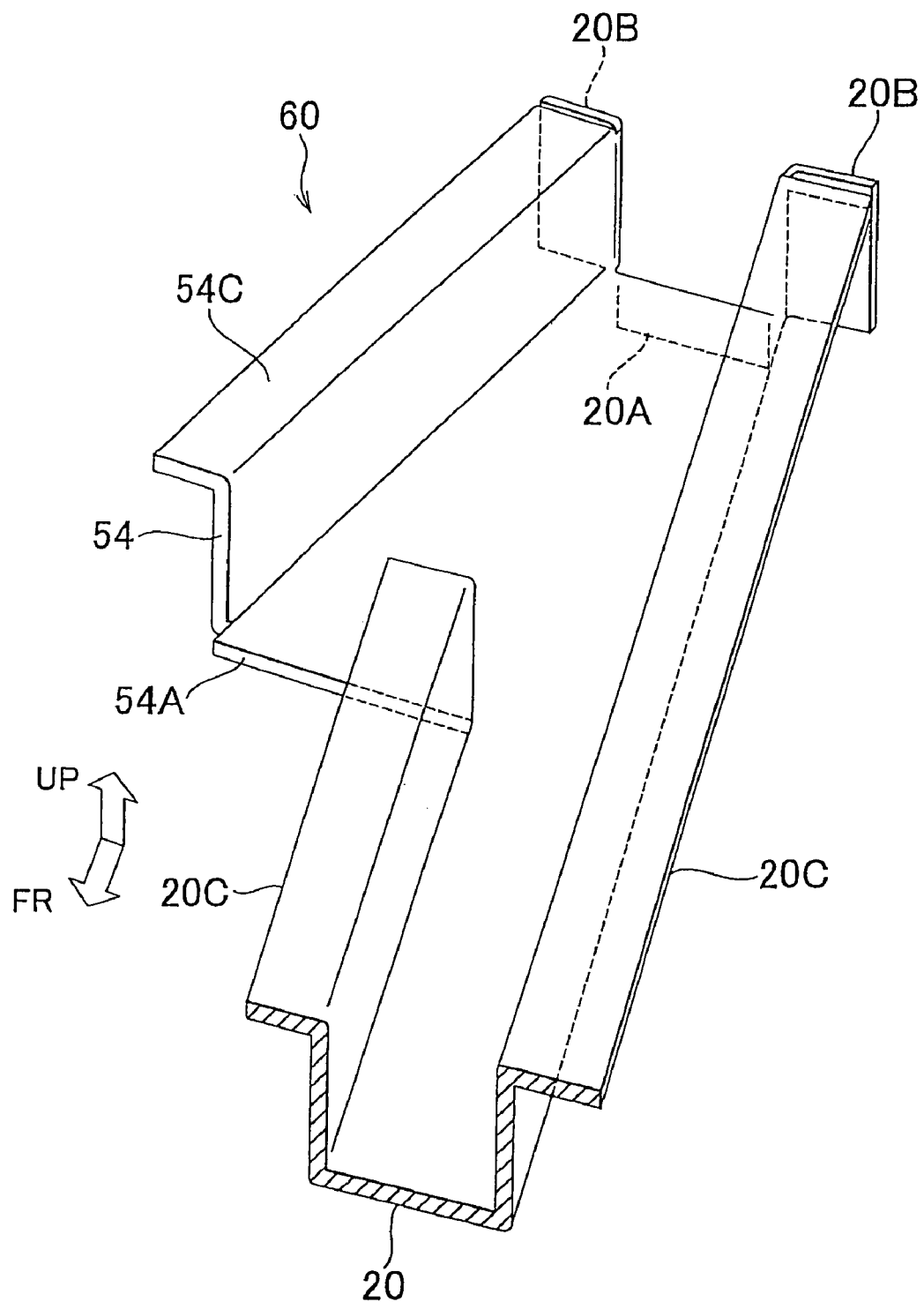
FIG. 11 is a is a perspective view illustrating a main portion of the left side rear structure of the vehicle as viewed from the front left of the vehicle according to a fourth embodiment of the present invention.

FIG. 11 is a perspective view illustrating the main portion of the left side rear structure 60 of the vehicle as viewed from the left front of the vehicle according to a fourth embodiment of the present invention.

The rear structure 60 of the vehicle according to the fourth embodiment is similar to that of the third embodiment; however, the following portions are different.

In the rear structure 60 of the vehicle, the supplemental gusset 54 is integrally formed with the rear floor side member 20. The bottom wall and the front extended portion 54A of the supplemental gusset 54 form the bottom wall of the rear floor side member 20. Further, the sidewall of the supplemental gusset 54 forms the lateral inboard sidewall of the rear floor side member 20. Furthermore, the inboard bent portion 54C of the supplemental gusset 54 forms the lateral inboard upper bent portion 20C of the rear floor side member 20. The outer extended portion 54B and the rear extended portion 54D of the supplemental gusset 54 are not provided (separately).

The front extended portion 54A of the supplemental gusset 54 is connected to the bottom wall of the rear floor crossmember 52. The inboard bent portion 54C of the supplemental gusset 54 is connected to the rear side upper bent portion 52B of the rear floor crossmember 52 and the rear floor panel 28. Thus, the supplemental gusset 54 connects the rear floor side member 20 and the rear floor crossmember 52 in an oblique direction that extends longitudinally forwardly and the laterally inwardly. The supplemental gusset 54 is also connected to the rear floor panel 28.

According to the fourth embodiment of the present invention, the merits and advantages similar to those of the third embodiment can be achieved, except for the merits and advantages achieved by providing the supplemental gusset 54 and the rear floor side member 20 separately.

Further, because the supplemental gusset 54 and the rear floor side member 20 are integrally formed, the increase in weight and cost of the vehicle body is minimized.

Figure 12A:
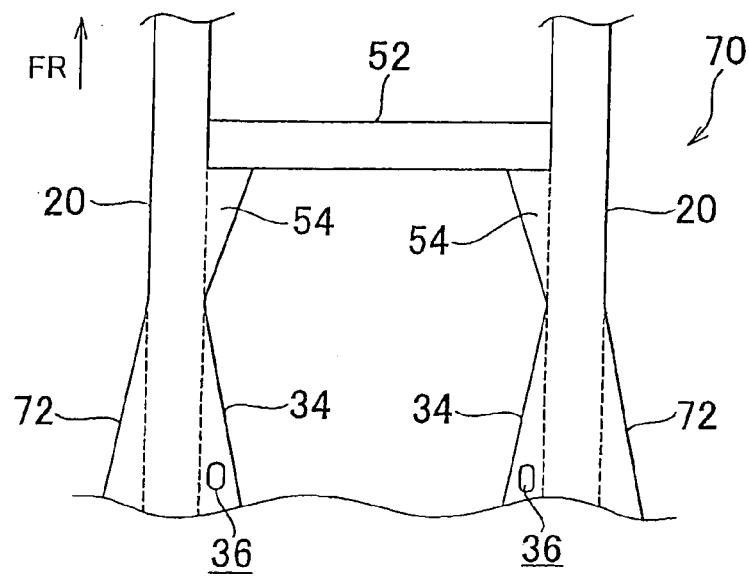
FIG. 12 A is a schematic plan view of a vehicle rear structure as viewed from above the vehicle according to a fifth embodiment of the present invention.
FIG. 12B is a perspective view illustrating a main portion of the left side rear structure of the vehicle as viewed from the rear right of the vehicle according to the fifth embodiment of the present invention.
Figure 12B:
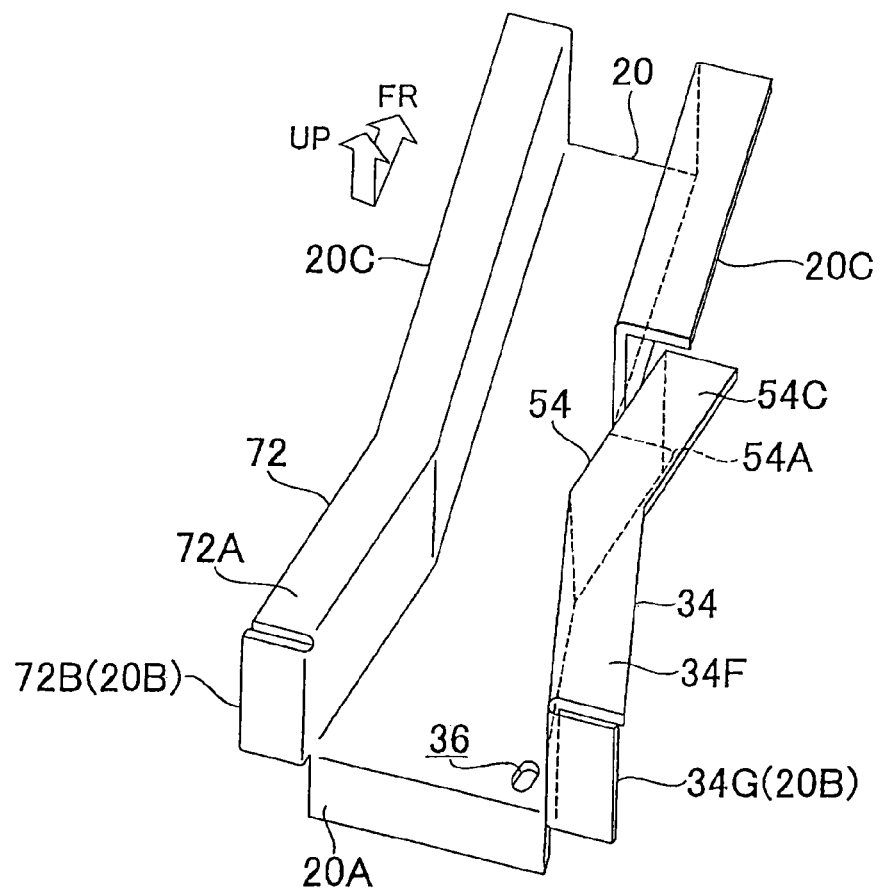

FIG. 12A is a schematic plan view of the rear structure 70 of the vehicle as viewed from above the vehicle according to a fifth embodiment of the present invention. FIG. 12B is a perspective view illustrating a main portion of the left side rear structure 70 of the vehicle as viewed from the rear right of the vehicle.

The rear structure 70 of the vehicle according to the fifth embodiment is similar to that of the fourth embodiment; however, the following portions are different.

In the rear structure 70 of the vehicle, the gusset 34 is integrally formed with the rear floor side member 20, and is located behind the supplemental gusset 54. The gusset 34 is a plate having an L-shaped cross-section. The triangular bottom wall of the gusset 34 extends generally horizontally. The rectangular sidewall of the gusset 34 extends generally vertically. An inboard bent portion 34F is provided at the upper end of the gusset 34. The inboard bent portion 34F is bent laterally inboard from the sidewall of the gusset 34, and forms the lateral inboard upper bent portion 20C of the rear floor side member 20. An inboard attachment portion 34G is provided at the rear end of the gusset 34. The inboard attachment portion 34G is bent laterally inboard from the sidewall of the gusset 34, and forms the lateral inboard side bent portion 20B of the rear floor side member 20.

The inboard bent portion 34F of the gusset 34 is connected to the rear floor panel 28. The inboard attachment portion 34G is connected to the lower back reinforcement 16, or alternatively may be connected to the lower back panel 12. Thus, the gusset 34 connects the lower back reinforcement 16 and the rear floor side member 20 in an oblique direction that extends longitudinally forwardly and laterally outwardly. In addition, the gusset 34 is connected to the rear floor panel 28.

An outer gusset 72, which is an example of a fourth connecting portion, is located at the laterally outward of the rear floor side member 20. The outer gusset 72 is integrally formed with the rear floor side member 20. The outer gusset 72 is a plate having an L-shape in cross-section. A triangle bottom wall of the outer gusset 72 extends generally horizontally. A rectangular sidewall of the outer gusset 72 extends generally vertically. The sidewall of the outer gusset 72 extends laterally outwardly at a predetermined angle (e.g. 10 degrees) from the longitudinal direction as it goes from front to rear of the vehicle, similar to the sidewall of the supplemental gusset 54. An outer bent portion 72A is provided at the upper end of the outer gusset 72. The outer bent portion 72A is bent laterally outward from the sidewall of the outer gusset 72 and forms the lateral outward upper bent portion 20C of the rear floor side member 20. An outer attachment portion 72B is provided at the rear end of the outer gusset 72. The outer attachment portion 72B is bent laterally outward from the sidewall of the outer gusset 72, and forms the laterally outward side bent portion 20B of the rear floor side member 20.

The outer bent portion 72A of the outer gusset 72 is connected to the rear floor panel 28. The outer attachment portion 72B of the outer gusset 72 is connected to the lower back panel 12, or alternatively, may be connected to the lower back reinforcement 16. Thus, the outer gusset 72 connects the lower back panel 12 and the rear floor side member 20 in an oblique direction that extends longitudinally forward and laterally inboard. In addition, the outer gusset 72 is connected to the rear floor panel 28.

According to the fifth embodiment of the present invention, the merits and advantages similar to those of the fourth embodiment can be achieved.

Further, in the fifth embodiment, the outer gusset 72 connects the lower back panel 12 and the rear floor side member 20 in an oblique direction that extends longitudinally forward and laterally inboard. Accordingly, the rear floor crossmember 52, which has a sufficient yield strength margin, more appropriately absorbs a collision load applied from an oblique rear direction, in particular, in the direction along the sidewall of the outer gusset 72.

In addition, the gusset 34 and outer gusset 72 are integrally formed with the rear floor side member 20. Accordingly, any increase in weight and cost of the vehicle body may be minimized.

In the fifth embodiment, the gusset 34 and the rear floor side member 20 are integrally formed. Alternatively, however, the gusset 34 may instead be integrally formed with the lower back reinforcement 16.

In the fifth embodiment, the outer gusset 72 and the rear floor side member 20 are integrally formed. Alternatively, however, the outer gusset 72 may instead be integrally formed with either the lower back panel 12 or the lower back reinforcement 16.

Further, in the fifth embodiment, the outer gusset 72 and the rear floor side member 20 are integrally formed. However, the outer gusset 72 may be provided independently from the rear floor side member 20, the lower back panel 12 or the lower back reinforcement 16.

In the above-described first through fifth embodiments, the gusset 34 connects the lower back reinforcement 16 and the rear floor side member 20 below the rear floor panel 28. Alternatively, however, the gusset 34 may connect the lower back reinforcement 16 and the rear floor side member 20 above the rear floor panel 28.

Further, in the above-described third to fifth embodiments, the supplemental gusset 54 connects the rear floor side member 20 and the rear floor crossmember 52 below the rear floor panel 28. Alternatively, the gusset 54 may connects the rear floor side member 20 and the rear floor crossmember 52 above the rear floor panel 28.

Further, in the fourth and fifth embodiments, the supplemental gusset 54 and the rear floor side member 20 are integrally formed. Alternatively, however, the supplemental gusset 54 may be integrally formed with the rear floor crossmember 52.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A rear structure of a vehicle, comprising:
    a lower back panel that is provided at a rear of the vehicle and forms the lower rear portion of the vehicle and is perpendicular to the longitudinal direction of the vehicle;
    a lower back reinforcement member that is provided in front of the lower back panel and reinforces the lower back panel;
    a rear floor panel that is provided in front of the lower back panel;
    a rear floor side member that reinforces the rear floor panel, and extends in the longitudinal direction of the vehicle;
    a first connecting portion that connects the lower back reinforcement member and the rear floor side member in a laterally and longitudinally oblique direction of the vehicle, wherein:
        the first connecting portion has first and second surfaces, the first surface contacting the lower back reinforcement member, and the second surface contacting the rear floor side member; and
        a rear end of the first surface is positioned longitudinally even with or longitudinally rearward of the second surface; and
    a second connecting portion that connects the lower back reinforcement member and the rear floor side member.

2. The rear structure according to claim 1, wherein the first connecting portion is located above the rear floor panel.

3. The rear structure according to claim 1, wherein the first connecting portion is located below the rear floor panel.

4. The rear structure according to claim 1, wherein the first connecting portion is provided separately from the lower back reinforcement member and the rear floor side member.

5. The rear structure according to claim 1, wherein the first connecting portion is integrally formed with at least one of the lower back reinforcement member and the rear floor side member.

6. The rear structure according to claim 1, wherein at least one of the lower back reinforcement member and the rear floor side member is connected to the first connecting portion in a vertical direction of the vehicle.

7. The rear structure according to claim 1, wherein the second connecting portion is integrally formed with the rear floor panel.

8. The rear structure according to claim 1, wherein the second connecting portion is provided separately from the rear floor panel.

9. The rear structure according to claim 1, further comprising a spare tire storage well in the rear floor panel,
    wherein the second connecting portion is formed by decreasing the lateral width of the spare tire storage well around the rear end of the vehicle.

10. The rear structure according to claim 1, wherein the second connecting portion is connected to at least one of the lower back reinforcement member and the rear floor side member in a vertical direction of the vehicle.

11. A rear structure of a vehicle, comprising:
    a lower back panel that is provided at a rear of the vehicle and forms the lower rear portion of the vehicle and is perpendicular to the longitudinal direction of the vehicle;
    a lower back reinforcement member that is provided in front of the lower back panel and reinforces the lower back panel;
    a rear floor panel that is provided in front of the lower back panel;
    a rear floor side member that reinforces the rear floor panel;
    a first connecting portion that connects the lower back reinforcement member and the rear floor side member in a laterally and longitudinally oblique direction of the vehicle;
    a second connecting portion that connects the lower back reinforcement member and the rear floor side member;
    a rear floor crossmember that is located in front of the lower back panel and reinforces the rear floor panel; and
    a third connecting portion that connects the rear floor side member and the rear floor crossmember in a laterally and longitudinally oblique direction of the vehicle.

12. The rear structure according to claim 11, wherein the third connecting portion is located above the rear floor panel.

13. The rear structure according to claim 11, wherein the third connecting portion is located below the rear floor panel.

14. The rear structure according to claim 11, wherein the third connecting portion is provided separately from the rear floor side member and the rear floor crossmember.

15. The rear structure according to claim 11, wherein the third connecting portion is integrally formed with at least one of the rear floor side member and the rear floor crossmember.

16. The rear structure according to claim 11, wherein the third connecting portion is connected to at least one of the rear floor side member and the rear floor crossmember in the vertical direction of the vehicle.

17. The rear structure according to claim 1, further comprising a fourth connecting portion that is integrally formed with at least one of the rear floor side member, the lower back panel and the lower back reinforcement member, and connects the lower back panel and the rear floor side member in an oblique direction extending longitudinally forward of and laterally inward from the rear end of the vehicle.

* * * * *